March 2, 1926.
E. L. HARRY
1,575,426
BRAKE MECHANISM
Filed May 7, 1924
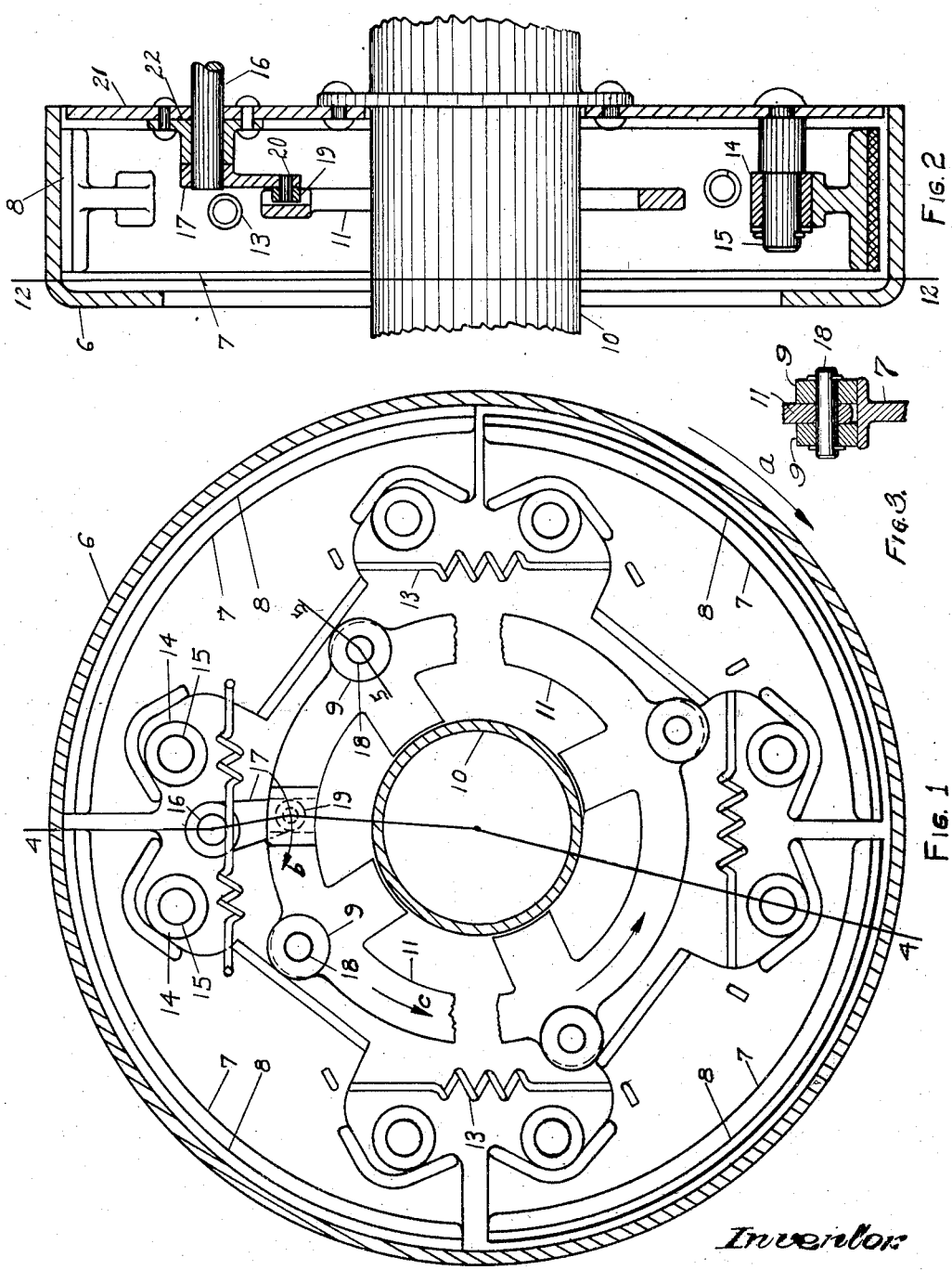
Inventor
Earl L Harry Patented Mar. 2, 1926.

1,575,426

UNITED STATES PATENT OFFICE.

EARL L. HARRY, OF PONTIAC, MICHIGAN.

BRAKE MECHANISM.

Application filed May 7, 1924. Serial No. 711,638.

*To all whom it may concern:*

Be it known that I, EARL L. HARRY, a citizen of Pontiac, in the county of Oakland and State of Michigan, have invented a new and useful Brake Mechanism, of which the following is a specification.

My invention relates to improvements in brake mechanisms, more particularly for use with a heavy type of motor vehicle which requires a powerful brake that may be operated by the expenditure of a small or reasonable amount of energy on the part of the operator or driver of said vehicle.

The main objects of the invention are, 1st to provide a more powerful brake and 2nd, to provide a brake of longer life.

In the following description I shall refer to the accompanying drawing in which, Fig. 1 is a view on line 12—12 of Fig. 2.
Fig. 2 is a view on line 4—4 of Fig. 1.
Fig. 3 is a view on line 5—5 of Fig. 1.

The brake drum 6 is to be secured to a road wheel in the usual manner. To the axle housing 10, a brake disc 21, is rigidly secured upon which is mounted the anchor pins, 15, the anchor rollers 14, and the brake shaft 16. Upon the axle housing 10, is mounted the cam plate 11 which may be rotated in either direction about said axle housing and carries the cam rollers 9. To the brake shoes 7 are riveted the brake shoe linings 8 in the usual manner.

The cam plate 11 is shown broken in two parts in order that two of the shoes may be shown in the position which they would hold when brakes are set, while the other two shoes are shown in the position which they would hold when the brakes are in the off position. The springs 13 are attached to the shoes in such a manner that they will be under tension at all times.

It will be understood that when the vehicle is in motion the brake drum will rotate with the road wheel about the axle housing, the direction of which rotation will depend upon the forward or rearward motion of the vehicle. Also it will be understood that the brake effort secured, or the resistance to the forward or rearward motion of the vehicle to be derived from the use of this brake mechanism, will depend upon the pressure produced between the brake shoe and brake drum.

Considering now the operation of the described invention and the functions of the various parts, if we consider that the brake drum 6 is rotating in the direction as indicated by the arrow at "a," the brake shaft 16, upon which is mounted the lever 17 carrying the roller 19, will be rotated through a small arc in the direction as indicated by the arrow at "b." It will, of course, be understood that the rotation of this shaft 16 will be actuated and controlled by the operator or driver of the vehicle, through suitable means of connection. As the roller 19 is in a slot or groove in the cam plate 11, it will cause the cam plate to rotate through a small arc about its center in the direction as indicated by arrow at "C." The rollers 9, which are mounted upon the cam plate by means of the pins 18, will be forced against the shoes 7, thus forcing the shoes and brake lining 8 outward in a radial direction until the latter will come in contact with the brake drum. When the brake lining comes in contact with the rotating drum, due to the friction between the two, the brake shoes will tend to rotate in the same direction as the drum, consequently the shoes will be forced against the anchor rollers. Here it should be noted that the surface of the shoes 7, which is in contact with the rollers 14, is in such a position that when the shoes are forced against the rollers there will be a wedging of the brake shoes and brake linings between the rollers 14 and the drum 6 and thus further increase the pressure between the brake lining and brake drum, and consequently increase the resistance to the rotation of the drum.

It will at once then be seen that an important feature of this invention is the wedging of the brake shoes and lining between the brake anchors and brake drum, where by a large increase in brake effort is obtained over that which would otherwise be the case, were no wedging action available.

An inspection of the drawing Fig. 1 will show that a very large percentage of the circumference of the brake drum is in contact with the brake lining which fact is an important factor tending to increase the length of life of the lining.

The function of the brake springs 13 is to draw the brake shoes away from the drum and hold them firmly against the anchor rollers and thus prevent what is commonly known as brake drag and also to prevent any rattling of the various parts at such time as when the brake is not in use.

A feature of this mechanism worthy of note is that it will operate equally advantageous whether the vehicle is moving in a forward or rearward direction.

While I have here shown my invention only as applied in connection with a road wheel of a vehicle, it will be plan to an engineer that this mechanism may be otherwise located such as on a propellor shaft without violating any of the principles herein involved. Also that said mechanism may be operated otherwise than as shown, such as hydraulically or electrically without violating any of the involved principles.

What I claim is:—

1. In a brake mechanism, a brake drum, a series of two or more rigid brake shoes arranged concentrically within the drum and adapted to have frictional engagement with said drum, each shoe having substantially at each end two guiding planes converging toward the brake drum rim, a stationary abutment providing a support for the necessary brake shoe anchors, said anchors being in contact with the guiding planes of the shoes, a cam plate which may be rotated through a small arc, the rotation of which in one direction will force the shoes into frictional engagement with the brake drum and thereby cause said shoes to move through a limited distance with the drum and wedge between the brake anchors and drum and thereby increase the brake effort to be derived therefrom, the rotation of said camplate in the opposite direction will allow the shoes to be moved out of frictional engagement with the brake drum.

2. In a brake mechanism, a rotative brake drum, a series of rigid brake shoes arranged concentrically with the brake drum and within the brake drum and adapted to have frictional engagement with the drum, said shoes each having near each end guiding surfaces converging toward the drum rim, a series of stationary anchor rollers in contact with said surfaces, whereby when the shoes are moved into frictional engagement with the drum through suitable means of connection said shoes will move through a limited distance with the drum and become wedged between the drum and anchors and thereby increase the brake effort to be derived therefrom.

3. In a brake mechanism, a rotative brake drum, a series of rigid, segmentary brake shoes arranged concentrically within the drum and with the drum and adapted to have frictional engagement with the drum, guiding surfaces fixed to the shoes near the shoe ends and converging toward the drum rim, fixed anchor rollers within the drum and having rolling contact with the guiding planes of the shoes, a camplate having a limited rotary motion in either direction and so constructed as to exert a cam action on the brake shoes and consequently move said shoes into or out of frictional engagement with the drum, whereby when said frictional engagement occurs the shoes will have a limited movement with the rotating drum and wedge between the drum and anchor rollers and thereby increase the retarding force to the rotation of the drum.

4. In a brake mechanism, a brake drum, a series of two or more rigid brake shoes arranged concentrically within the drum and adapted to have frictional engagement with said drum, guiding planes rigidly connected to said shoes and located between the two ends of the shoes, said guiding planes converging toward the brake drum rim, a stationary brake disc providing a support for the necessary brake shoe anchors, said anchors being in contact with the guiding planes of the shoes, a cam plate which may be rotated through a small arc, the rotation of which in one direction will force the shoes into frictional engagement with the drum and thereby cause said shoes to move through a limited distance with the drum and wedge between the brake anchors and drum and thereby increase the brake effort to be derived therefrom, the rotation of said camplate in the opposite direction will allow the shoes to move out of frictional engagement with the brake drum.

5. In a brake mechanism, a rotative brake drum, a series of rigid brake shoes arranged concentrically with the brake drum and within the brake drum and adapted to have frictional engagement with the drum, guiding planes which are a part of said shoes and located between the two ends of the shoes, said guiding planes converging outward toward the brake drum rim, a series of stationary anchor rollers in contact with said guiding planes, whereby when the shoes are moved into frictional engagement with the drum through suitable means of connection said shoes will move through a limited distance with the drum and become wedged between the drum and the anchor rollers and thereby increase the brake effort to be derived therefrom.

6. In a brake mechanism, a rotative brake drum, a series of rigid segmentary brake shoes arranged concentrically within the drum and with the drum and adapted to have frictional engagement with the drum, guiding planes which are fixed to the shoes at or between the two ends of the shoes and which converge toward the drum rim, fixed anchor rollers within the drum and having rolling contact with the guiding planes of the shoes, a cam plate having a limited rotatory motion in either direction and so constructed as to exert a cam action on the brake shoes and consequently move said shoes into and out of frictional engagement with the drum, whereby when said frictional engagement occurs the shoes will have a limited movement with the rotating drum and wedge between the drum and the anchor rollers and thereby increase the retarding force to the rotation of the drum.

7. In a brake mechanism, a rotative brake drum, a series of rigid segmentary brake shoes arranged concentrically within the brake drum and with the brake drum and adapted to have frictional engagement with said drum, guiding surfaces fixed to the shoes and converging toward the drum rim, fixed anchor rollers within the drum and having rolling contact with the guiding surfaces of the shoes, a cam plate having a limited rotatory motion in either direction and so constructed as to exert a cam action on the brake shoes and consequently move said shoes into frictional engagement with the drum, whereby when said frictional engagement occurs the shoes will have a limited movement with the rotating drum and wedge between the drum and anchor rollers and thereby increase the retarding force to the rotation of the drum.

8. In a brake mechanism, a rotative brake drum, a series of rigid segmentary brake shoes, arranged concentricaly with the drum and within the drum and adapted to have frictional engagement with the drum, fixed guiding planes within the drum and so directed that when the shoes are moved into frictional engagement with the drum through suitable means of connection said shoes will have a limited movement with the rotating drum and wedge between the fixed guiding planes and the drum and thereby increase the brake effort to be derived therefrom.

EARL L. HARRY.